US008020146B2

(12) United States Patent
Hudson, Jr.

(10) Patent No.: US 8,020,146 B2
(45) Date of Patent: Sep. 13, 2011

(54) APPLYING DEFERRED REFACTORING AND API CHANGES IN AN IDE

(75) Inventor: Thomas R. Hudson, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 11/459,396

(22) Filed: Jul. 24, 2006

(65) Prior Publication Data

US 2008/0022266 A1    Jan. 24, 2008

(51) Int. Cl.
G06F 9/44 (2006.01)
G06F 9/45 (2006.01)
(52) U.S. Cl. .................... 717/120; 717/140; 717/168
(58) Field of Classification Search .............. 717/140, 717/120, 168
See application file for complete search history.

(56) References Cited

U.S. PATENT DOCUMENTS

| | | | |
|---|---|---|---|
| 5,822,591 A | 10/1998 | Hochmuth | |
| 5,832,270 A * | 11/1998 | Laffra et al. | 717/125 |
| 6,667,747 B1 | 12/2003 | Spellman et al. | |
| 6,804,682 B1 * | 10/2004 | Kemper et al. | 1/1 |
| 6,807,548 B1 * | 10/2004 | Kemper | 1/1 |
| 7,370,318 B1 * | 5/2008 | Howe et al. | 717/110 |
| 7,409,208 B1 * | 8/2008 | Clare et al. | 455/419 |
| 7,451,439 B2 * | 11/2008 | Nickell et al. | 717/159 |
| 7,614,046 B2 * | 11/2009 | Daniels et al. | 717/170 |
| 2002/0023257 A1 | 2/2002 | Charisius et al. | |
| 2003/0023956 A1 * | 1/2003 | Dulberg et al. | 717/130 |
| 2003/0149960 A1 | 8/2003 | Inamdar | |
| 2004/0226007 A1 | 11/2004 | Guarraci | |
| 2005/0010911 A1 | 1/2005 | Kim et al. | |
| 2005/0034109 A1 | 2/2005 | Hamilton et al. | |
| 2006/0282479 A1 * | 12/2006 | Johnson et al. | 707/203 |
| 2007/0113066 A1 * | 5/2007 | Samba et al. | 713/1 |

FOREIGN PATENT DOCUMENTS

| | | |
|---|---|---|
| JP | 05-313913 | 11/1992 |
| WO | WO 90/04227 | 4/1990 |

OTHER PUBLICATIONS

Baumer et al. (Integrating Refactoring Support into a Java Development Tool, OOPSLA'01 Companion , Oct. 2001).*
Mens et al. (A Survey of Software Refactoring, IEEE Transactions on Software Engineering, vol. 30, No. 2, Feb. 2004).*

* cited by examiner

Primary Examiner — Lewis A Bullock, Jr.
Assistant Examiner — Hang Pan
(74) Attorney, Agent, or Firm — Law Office of Jim Boice

(57) ABSTRACT

A method, apparatus and computer-readable medium for managing changes to a library in a Producer IDE is presented. In one embodiment, the method includes the steps of compiling user source code in a consumer's workspace using at least one class from an original class library to produce a user's executable binary files; searching the executable binary files for references to Application Program Interface (API) changes that occurred when the original class library was updated; and generating at least one work item for each of the API changes that is referred to by the user's executable binary files.

12 Claims, 9 Drawing Sheets

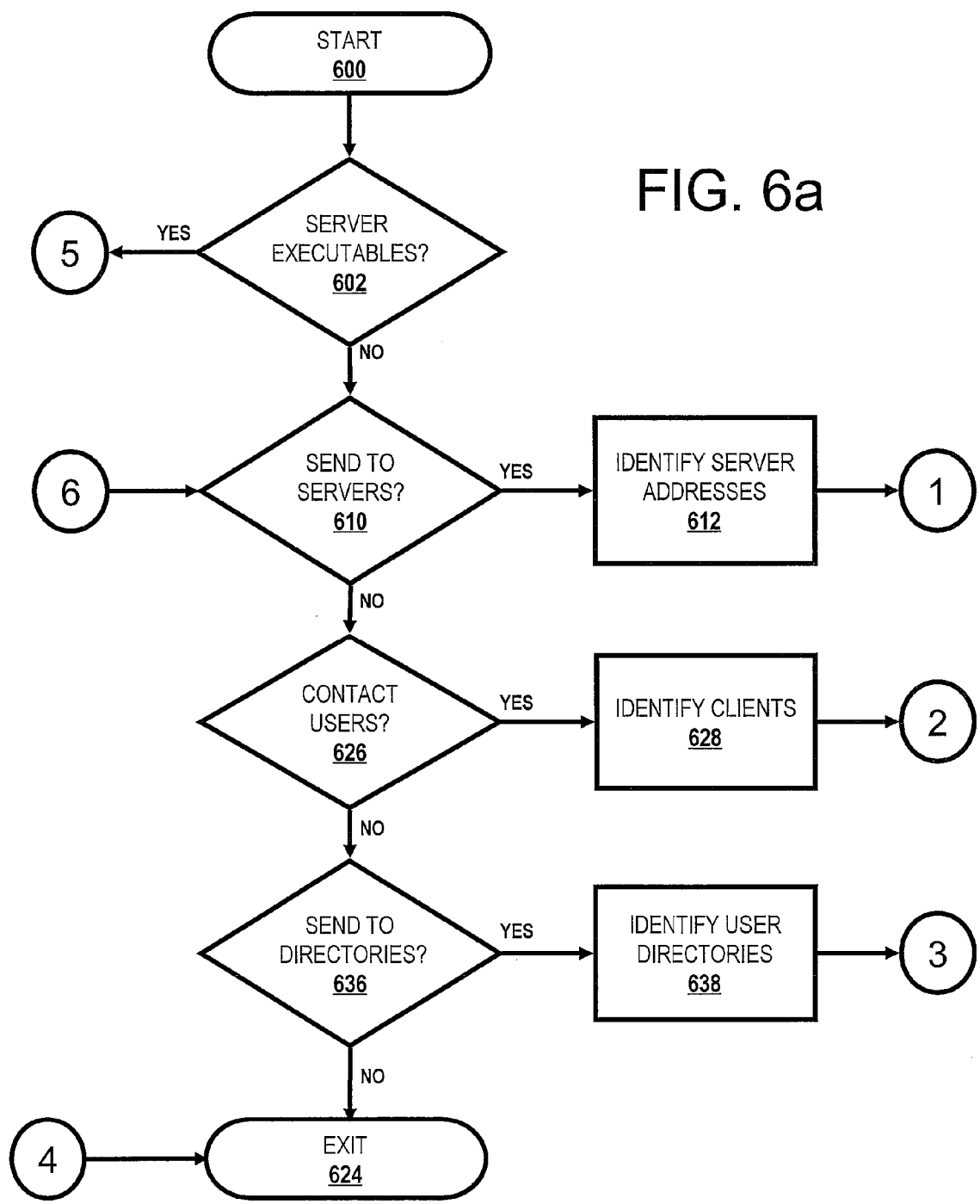

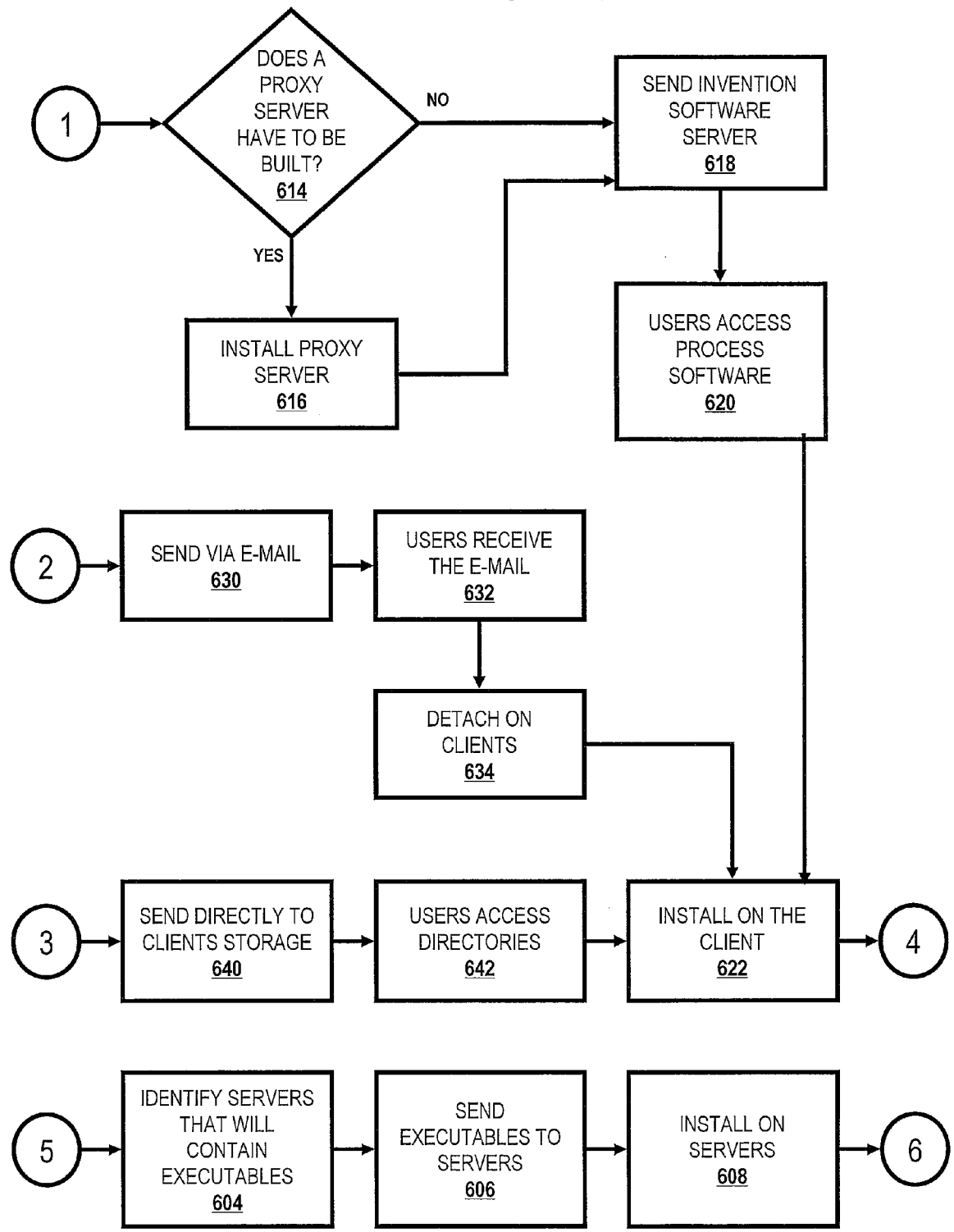

APPLYING DEFERRED REFACTORING AND API CHANGES IN AN IDE

BACKGROUND OF THE INVENTION

The present invention relates in general to the field of computers and similar technologies, and in particular to software utilized in this field.

A useful feature of Object Oriented Programming (OOP) is its modular nature and its ability to use and re-use objects from a producer's library. Thus, OOP allows a user to write an OOP program that makes a call to a library of objects, which has been created by a producer such as a third party class code provider. One feature of objects and classes, including those in the producer's library, is their ability to interface with other code, including other objects/classes, operating systems, etc. Code that controls and coordinates this interface is known as an Application Program Interface (API), which includes control routines, protocols, etc. required to interface with a particular object/class.

When object code changes (has a class or method renamed, is moved to another package, or is otherwise updated or modified in a process known as "refactoring"), API's that are attendant to (associated with) the changed object code are often also changed. For example, assume that a class is modified to change its name from "OldName" to "NewName." Thereafter, any code that previously was written to make a call to the class "OldName" (via an API for "OldName") must be modified to call the class "NewName." While current compilers will usually cause these name changes to be automatically corrected and promulgated throughout the source code in a workplace in an Integrated Development Environment (IDE), the user is forced to review the entire process, usually in a modal dialog. Thus, the user's code cannot be compiled until after all of the changes (e.g., replacing "Old-Name" with "NewName") have been made. This results in the condition that the changes cannot be processed individually to see the effects of each API change, such that there cannot be a scoping of the application for changes, and thus the review process is not scalable.

SUMMARY OF THE INVENTION

To address the problem described above regarding managing changes to a library in a Producer IDE, an improved method, apparatus and computer-readable medium is presented. In one embodiment, the method includes the steps of creating a log of Application Program Interface (API) changes that occurred when an original class library was updated as a new version class library; compiling user source code in a consumer's workspace using at least one class from an original class library to produce a user's executable binary files; searching the executable binary files for references to Application Program Interface (API) changes that occurred when the original class library was updated; and generating at least one work item for each of the API changes that is referred to by the user's executable binary files.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 6a-b show a flow-chart of steps taken to deploy software capable of executing the steps shown and described in FIGS. 1-3.

DETAILED DESCRIPTION OF THE PREFERRED EMBODIMENT

Figure 1:
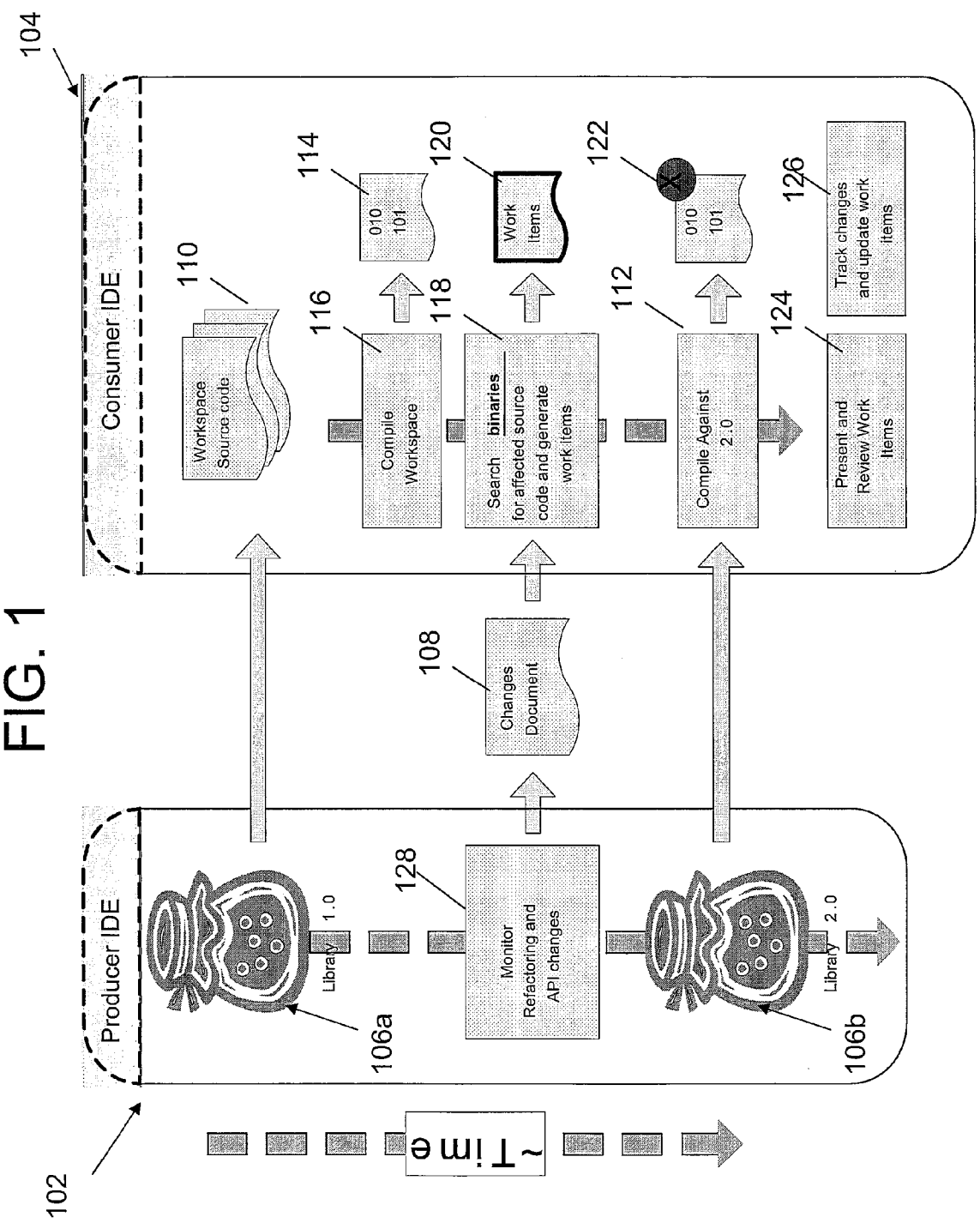
FIG. 1 illustrates a Producer Integrated Development Environment (IDE) and a Consumer IDE in which the present invention may be implemented.

With reference now to the figures, and in particular to FIG. 1, there is depicted a graph of a Producer Integrated Development Environment (IDE) 102 and Consumer IDE 104. Consumer IDE 104 is used by a developer who is consuming one or more libraries (e.g., a Java Archive—"JAR" in a Java environment) that have been created by a producer for use by developers (consumers). That is, Producer IDE 102 includes at least one original class library 106a, which is a library of classes (or alternatively, other software such as objects, routines, applets, etc.) which are available for use by developers using Consumer IDE 104. If and when (at a later time) the producer refactors (improves, updates, upgrades, etc.) the library file 106a (to generate a new version class library 106b), there may be changes to the Application Program Interfaces (APIs) associated with the files in the libraries 106.

As described above, libraries 106 are created by a producer (the supplier of the libraries 106), who provides documentation of changes (refactoring and API changes) to the library 106a when creating library 106b. These changes are monitored for (block 128), resulting in the creation of a changes document 108 simultaneously or prior to the creation of the new version class library 106b. Changes document 108, which is independent of the consumer's workspace (found in consumer IDE 104), causes a search of binaries for affected source code (block 118), as described below. Before a user's workspace source code 110, which originally created these affected binaries, can be recompiled (block 112), work items 120 are created. Work items 120 are created using code from new version class library 106b. By creating work items 120 before the user's workspace source code 110 is recompiled permits the accurate finding of affected workspace source code 110 from its error-free compiled state 114. How this finding is accomplished is IDE specific, but may be accomplished by hooking into the Consumer IDE's compiler and executing a finding routine before the re-compiling of the workspace source code occurs (block 116), using the new version class library 106b.

Figure 2:
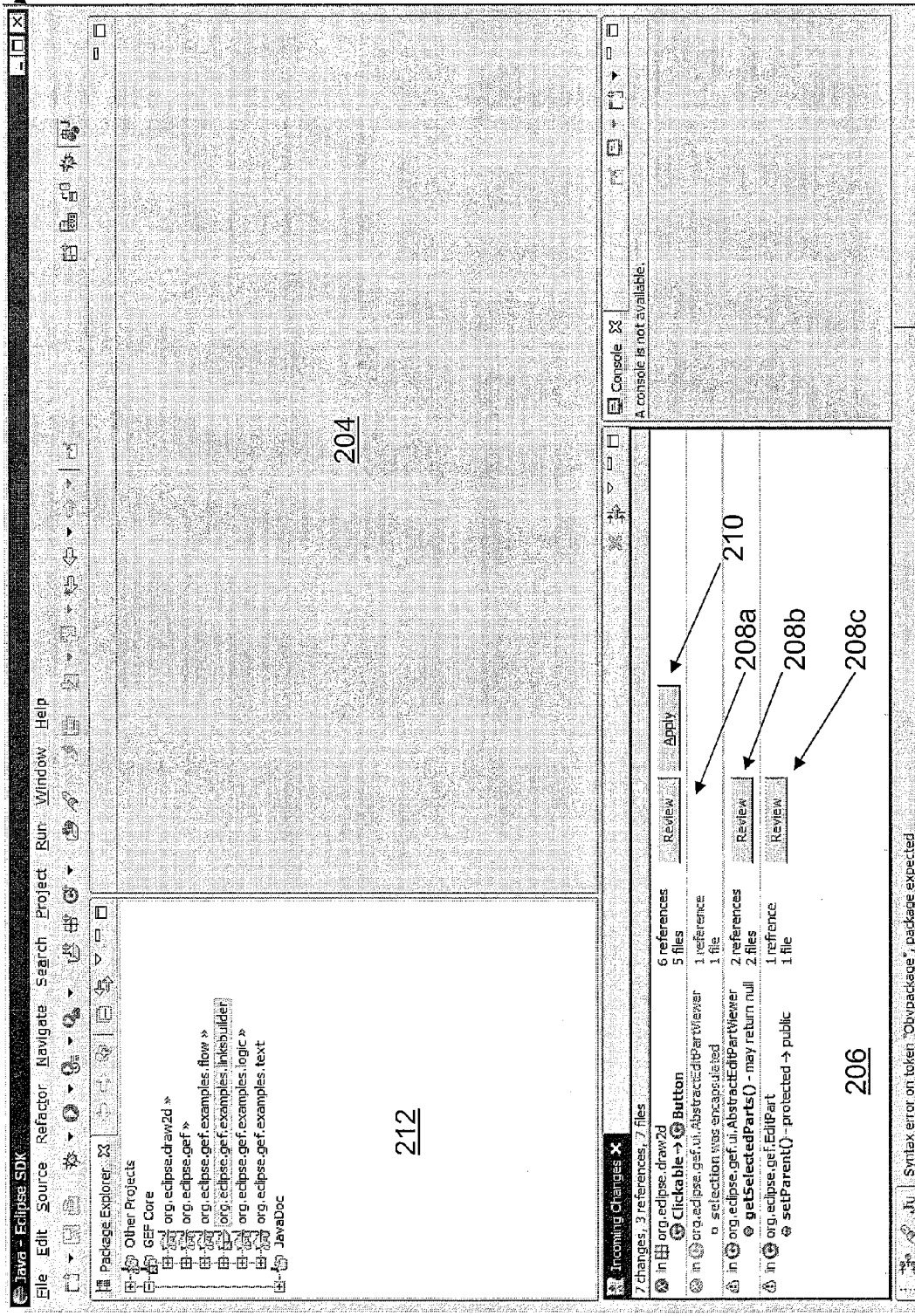
FIG. 2 depicts a User Interface (UI) of the Consumer IDE illustrated in FIG. 1.

A process based on a refactoring engine then begins a search of binaries for affected source code (block 118). From this search, work items 120 are emitted. Work items 120 contain an affected location (including line numbers where appropriate) in the workspace source code 110 and/or its binaries, and a link/reference to the change to the API. A User Interface then displays all of the work items 120 grouped by the causing API change. For example, FIG. 2 shows an exemplary User Interface (UI) 202 used with Consumer IDE 104. UI 202 includes a text editor pane 204, into which source code is typed and edited; a tasks/ToDo pane 206, which displays review items and their locations in the code; and a navigation tree pane 212, which displays, in a tree manner, some or all files available to a developer who is using the IDE. As described in block 124, shown in tasks/ToDo pane 206 are Application Program Interface (API) changes, from a log file of one or more pending work items 120 (shown in FIG. 1), such as the name change of the class "Clickable" to "Button" (indicating their respective functions). Similarly, a method in the class "SelectedParts" has loosened its contract (it can now return "null"), and the class "Parent" has been changed from a protected class to a public class. These changes can be tracked and work items updated after recompilation occurs (block 126). Note that tasks/ToDo pane 206 also may include "Review" buttons 208*a*-*c*, which allow the consumer to pull up a compare window showing all places in the workspace source code 110 and/or their binaries that are impacted by changes in the new version class library 106*b*, before clicking an "Apply" button 210 (as described in block 126 of FIG. 1). At that point, the workspace source code 110 can be recompiled against new version class library 106*b* to generate binaries 122 that result from the recompilation of the workspace source code 110.

Note also, that with reference to the API's shown in tasks/ToDo pane 206 (such as "org.eclipse.draw2d"), if an API change does not produce work items, then that API can be filtered from the list shown in tasks/ToDo pane 206. Furthermore, individual work items may appear in source code that is displayed in text editor pane 204 as markers to a particular line or section of code.

Figure 3:
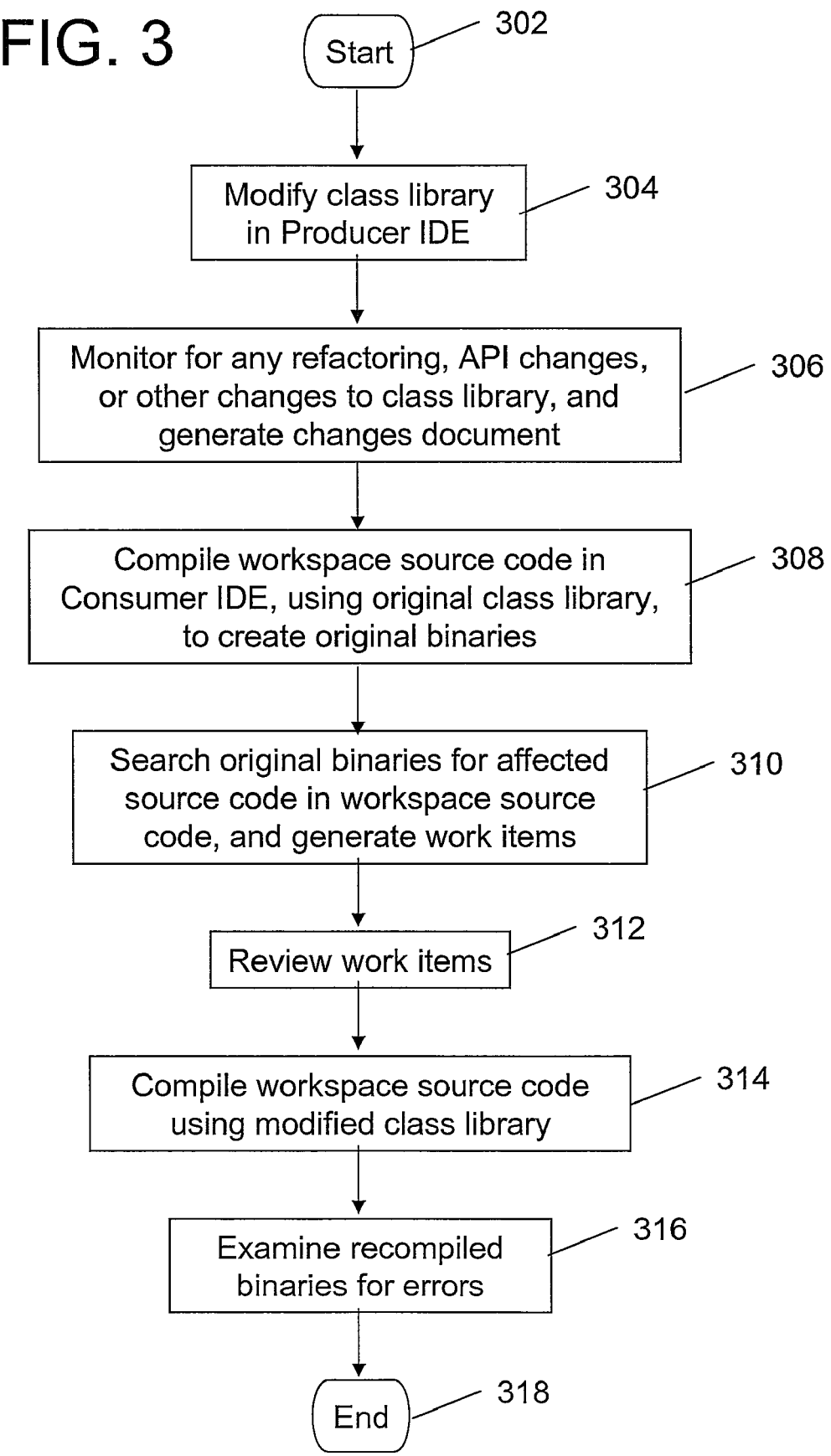
FIG. 3 illustrates a flow-chart of exemplary steps taken by the present invention to apply deferred refactoring and Application Program Interface (API) changes made in an IDE.

With reference now to FIG. 3, a flow-chart describing steps shown in FIGS. 1-2 is presented (which depict elements described herein). After initiator block 302, Library 1.0 is modified (updated, refactored, amended, etc.) in the Producer IDE as Library 2.0 (block 304). Monitoring is performed to identify any changes that occurred to Library 1.0 during this modification, and a changes document is generated (block 306). Using Library 1.0, a consumer's IDE compiles a user's workspace source code to generate original executable binaries (block 308). These original executable binaries are searched for affected source code by examining headers, class fields, byte codes, text signatures, fully qualified class names, packages (folder name in which source code is located), etc. in the binaries. From this information, work items showing where (including code line numbers) and by what means (a reference to the refactoring or API change) the changes occurred in the workspace source code and/or binaries using the new Library 2.0 (block 310). These work items are then reviewed, and if acceptable to the user, are accepted (block 312). Using the new Library 2.0, the user's workspace source code is recompiled (block 314), and the recompiled binaries are then examined (and corrected) for errors (block 316) before the process ends at terminator block 318.

Figure 4:
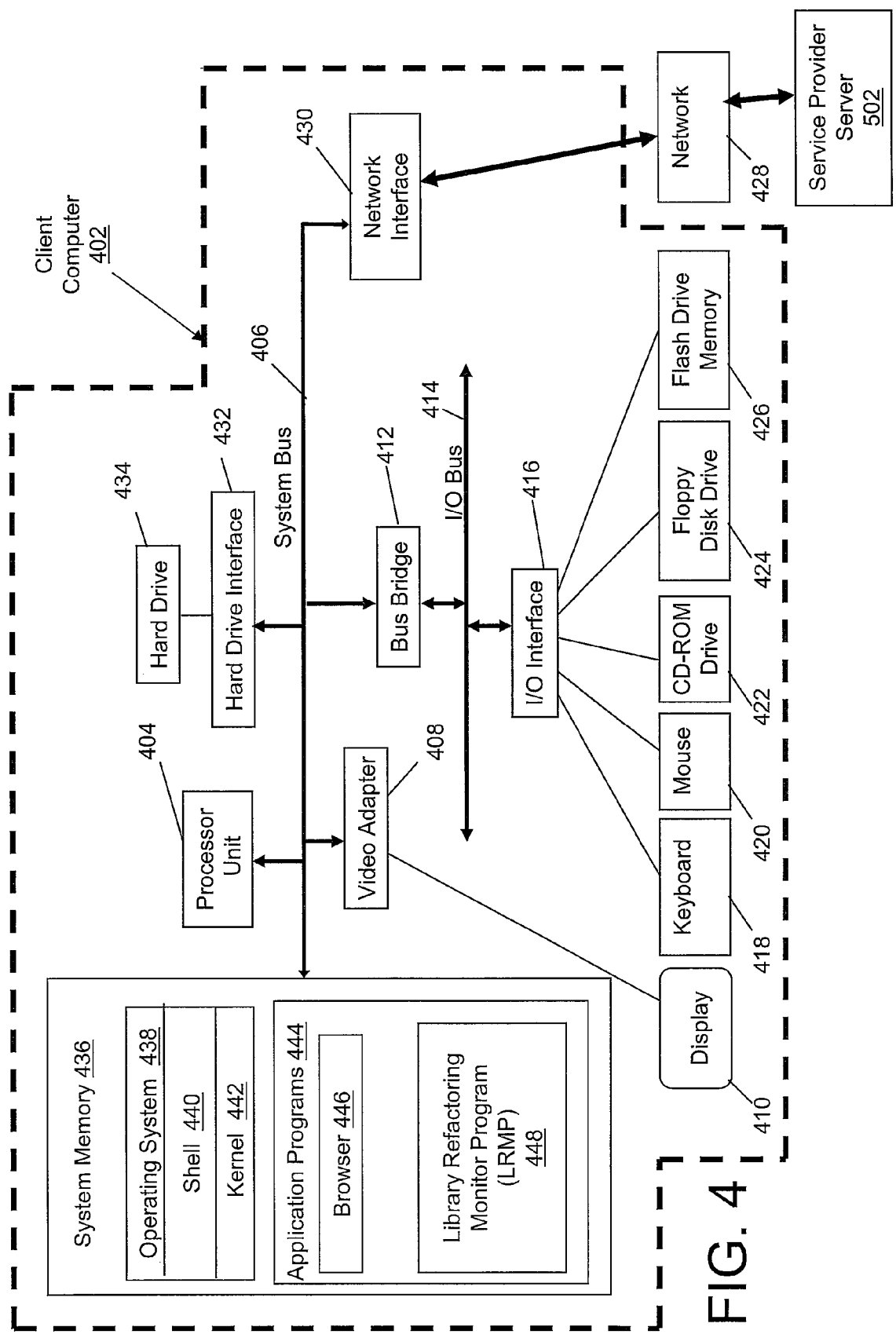
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414.

An I/O interface 416 is coupled to I/O bus 414. I/O interface 416 affords communication with various I/O devices, including a keyboard 418, a mouse 420, a Compact Disk—Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Library Refactoring Monitor Program (LRMP) 448, which includes PCGA 238 described above. LRMP 448 includes code for implementing the processes described in FIGS. 1-3. In one embodiment, client computer 402 is able to download LRMP 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
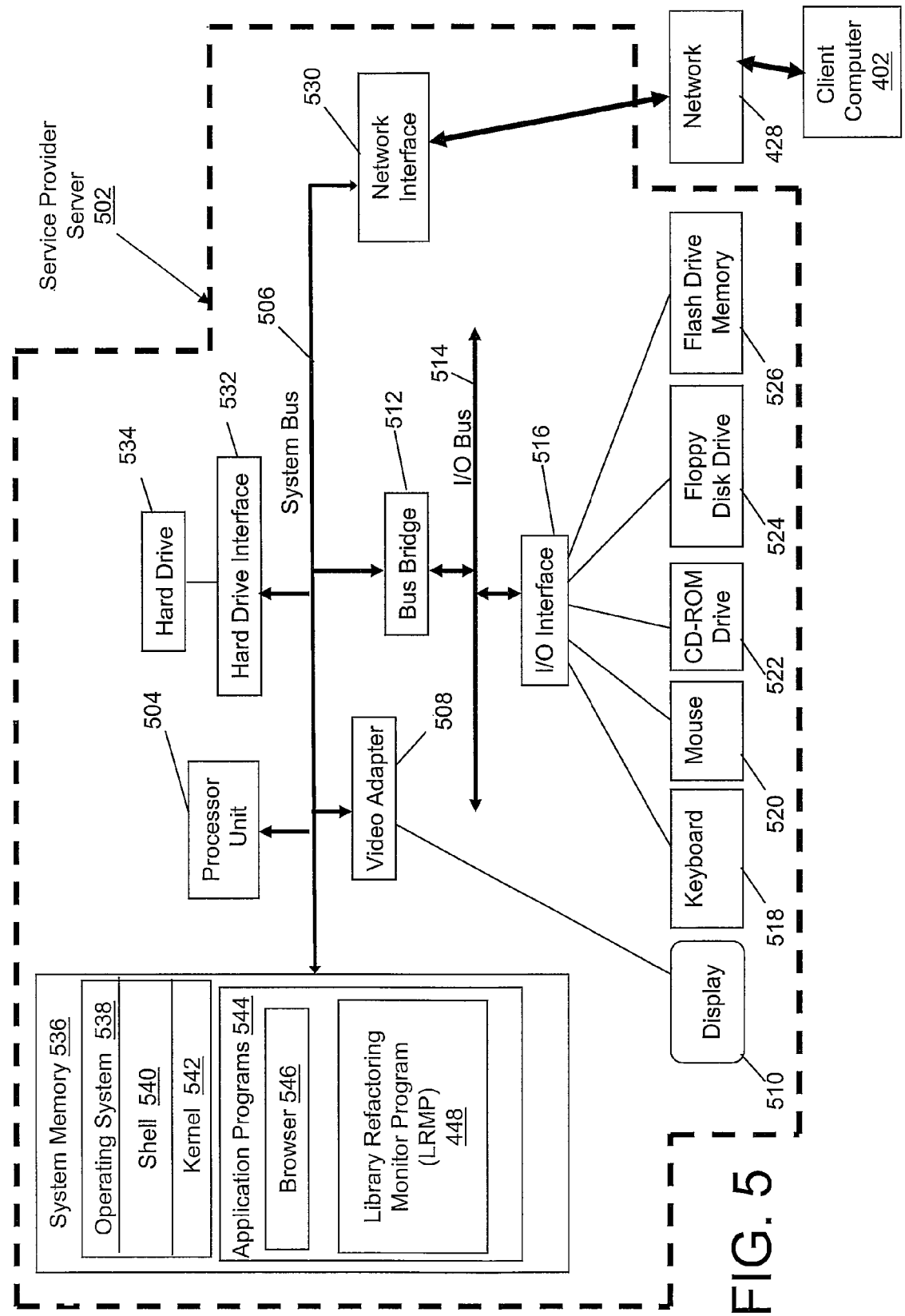
FIG. 5 illustrates an exemplary server from which software for executing the present invention may be deployed and/or implemented for the benefit of a user of the client computer shown in FIG. 4.

As noted above, LRMP 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk—Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download LRMP 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of LRMP 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of LRMP 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of LRMP 448, are performed by service provider server 502. Alternatively, LRMP 448 and the method described herein, and in particular as shown and described in FIGS. 1-3, can be deployed as a process software from service provider server 502 to client computer 402. Still more particularly, process software for the method so described may be deployed to service provider server 502 by another service provider server (not shown).

Referring then to FIGS. 6*a-b*, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made as to whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
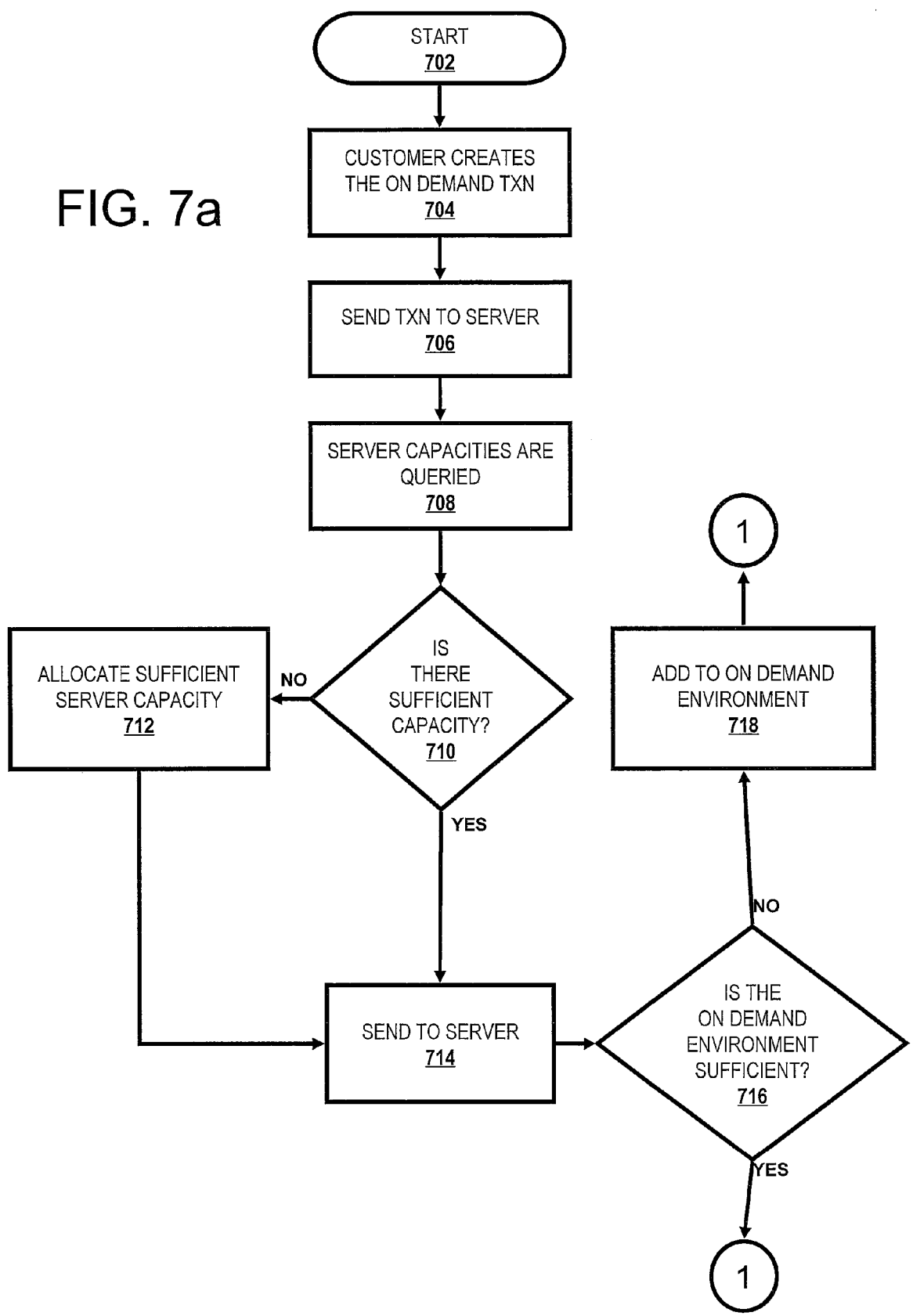
FIGS. 7a-b show a flow-chart showing steps taken to execute the steps shown and described in FIGS. 1-3 using an on-demand service provider.
Figure 7B:
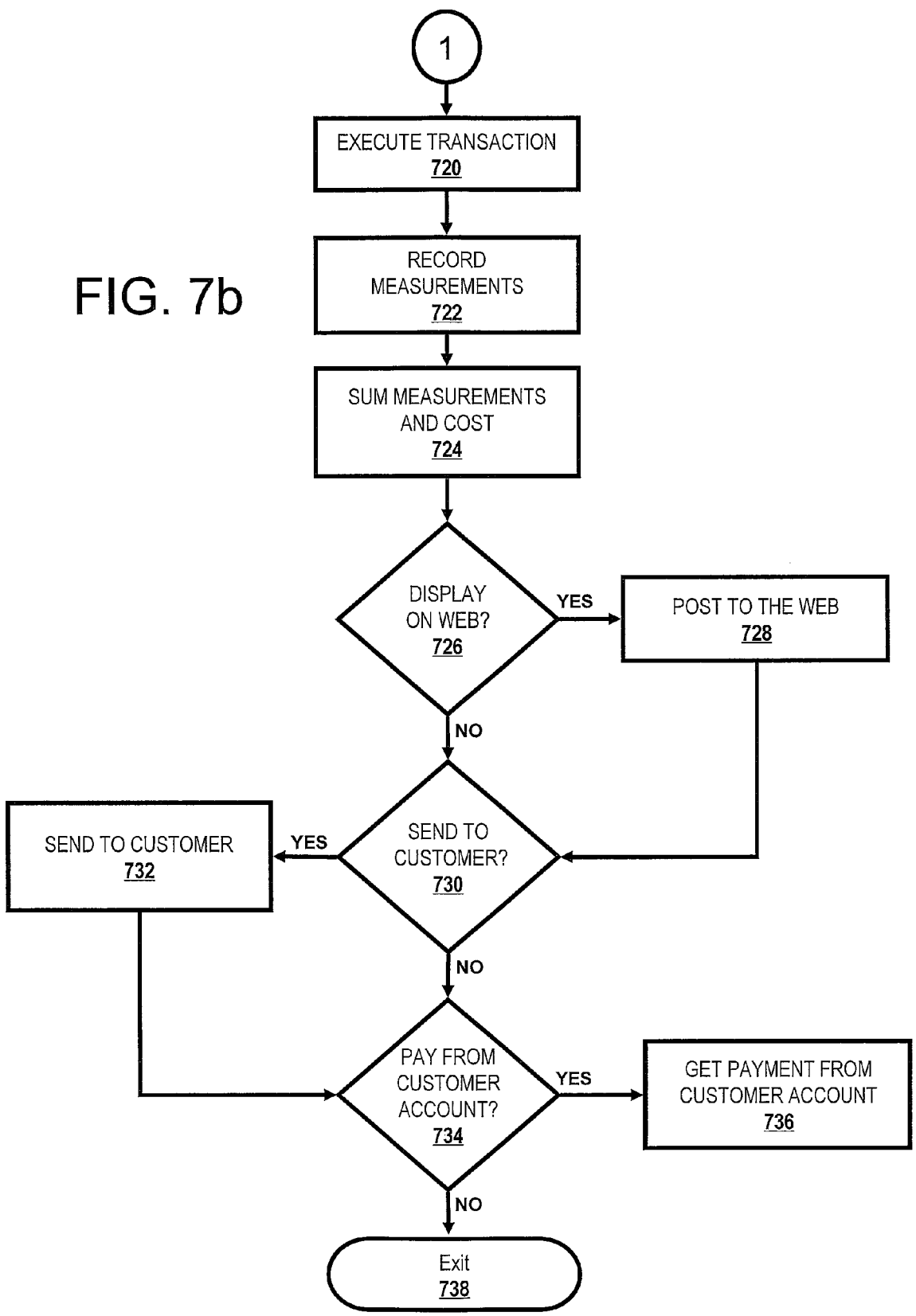

With reference now to FIGS. 7*a-b*, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient Available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

The present invention thus presents a method, system, and computer-readable medium for applying deferred refactoring and API changes in an IDE. In one embodiment, the method includes the steps of creating a log of Application Program Interface (API) changes that occurred when an original class library was updated as a new version class library; compiling source code in a consumer's workspace using at least one class from the original class library to produce executable binary files; searching the executable binary files for references to the API changes that occurred when the original class library was updated; and generating a work item for each of the API changes that is referred to by the executable binary files. The method may include the further steps of: after the searching and generating steps, compiling source code in the consumer's workspace using at least one class from the new version class library, and presenting a work item for each of API changes that occurs after source code in the consumer's workspace is compiled using at least one class from the new version class library, wherein the work item references a singular source code required change, and then presenting to a user an option to accept/reject the work item for implementation. In one embodiment, a log is created of the API changes that occurred when the original class library was updated as the new version class library, wherein the original class library and the new version class library are created and managed by a producer in a Producer Integrated Development Environment (IDE). In another embodiment, the log of API changes is an eXtensible Markup Language (XML) file that is contained within the new version class library. The method may also include the step of inserting a hook in a compiler that executes in a Consumer Integrated Development Environment (IDE) used by a consumer, wherein the hook checks for an existence of the new version class library and invokes the creating, compiling, searching and generating steps described above.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
   compiling user source code in a consumer's workspace using at least one class from an original class library to produce a user's executable binary files;
   searching the executable binary files for references to Application Program Interface (API) changes that occurred when the original class library was updated;
   generating at least one work item for each of the API changes that is referred to by the user's executable binary files;
   creating a log of the API changes that occurred when the original class library was updated as a new version class library;
   inserting a hook in a compiler that executes in a Consumer Integrated Development Environment (IDE) used by a consumer, wherein the hook checks for an existence of an updated class library that contains the log of API changes, and wherein the hook invokes said compiling, searching and generating.

2. The computer-implementable method of claim 1, further comprising:
   after the searching and generating steps, compiling source code in the consumer's workspace using at least one class from the new version class library.

3. The computer-implementable method of claim 1, further comprising:
   presenting a work item for each of the API changes that occurs after source code in the consumer's workspace is compiled using at least one class from the new version class library, wherein the work item references a singular source code required change; and presenting to a user an option to accept/reject the work item for implementation.

4. A system comprising:

a processor;

a data bus coupled to the processor;

a memory coupled to the data bus; and a computer-usable medium embodying computer program code, the computer program code comprising instructions executable by the processor and configured for:

compiling user source code in a consumer's workspace using at least one class from an original class library to produce a user's executable binary files;

searching the executable binary files for references to Application Program Interface (API) changes that occurred when the original class library was updated;

generating at least one work item for each of the API changes that is referred to by the user's executable binary files;

creating a log of the API changes that occurred when the original class library was updated as a new version class library;

inserting a hook in a compiler that executes in a Consumer Integrated Development Environment (IDE) used by a consumer, wherein the hook checks for an existence of an updated class library that contains the log of API changes, and wherein the hook invokes said compiling, searching and generating.

5. The system of claim 4, wherein the instructions are further configured for:

after the searching and generating steps, compiling source code in the consumer's workspace using at least one class from the new version class library.

6. The system of claim 5, wherein the instructions are further configured for:

presenting a work item for each of the API changes that occurs after source code in the consumer's workspace is compiled using at least one class from the new version class library, wherein the work item references a singular source code required change; and presenting to a user an option to accept/reject the work item for implementation.

7. A computer-usable storage medium embodying computer program code, the computer program code comprising computer executable instructions configured for:

compiling user source code in a consumer's workspace using at least one class from an original class library to produce a user's executable binary files;

searching the executable binary files for references to Application Program Interface (API) changes that occurred when the original class library was updated;

generating at least one work item for each of the API changes that is referred to by the user's executable binary files;

creating a log of the API changes that occurred when the original class library was updated as a new version class library;

inserting a hook in a compiler that executes in a Consumer Integrated Development Environment (IDE) used by a consumer, wherein the hook checks for an existence of an updated class library that contains the log of API changes, and wherein the hook invokes said compiling, searching and generating.

8. The computer-usable storage medium of claim 7, wherein the instructions are further configured for:

after the searching and generating steps, compiling source code in the consumer's workspace using at least one class from the new version class library.

9. The computer-usable storage medium of claim 8, wherein the instructions are further configured for:

presenting a work item for each of the API changes that occurs after source code in the consumer's workspace is compiled using at least one class from the new version class library, wherein the work item references a singular source code required change; and presenting to a user an option to accept/reject the work item for implementation.

10. The computer-implementable method of claim 1, further comprising:

displaying, in a pane of the Consumer IDE, said at least one work item as a name change to a class.

11. The computer-implementable method of claim 1, further comprising:

displaying, in a pane of the Consumer IDE, said at least one work item as a change of a private class to a public class.

12. The computer-implementable method of claim 1, further comprising:

grouping work items according to which of the API changes caused the work items to be created; and displaying, in a pane of the Consumer IDE, the work items as groups according to API changes that caused the work items to be created.

* * * * *